3,011,943
CONTROL OF MICROORGANISMS IN THE GASTROINTESTINAL TRACT

Alan B. Rogers, Palos Park, and John F. Roland, Jr., Glenview, Ill., assignors, by mesne assignments, to Armour and Company, Chicago, Ill., a corporation of Delaware
No Drawing. Filed Nov. 30, 1955, Ser. No. 550,169
13 Claims. (Cl. 167—53)

This invention relates to the control of microorganisms in mammals, and more particularly to a process for arresting the growth of microorganisms in the gastrointestinal tract.

This patent application is in part a continuation of our co-pending patent application Serial No. 383,913, filed October 2, 1953, now Patent No. 2,844,466.

The gastrointestinal tract is occupied by numerous microorganisms living in parasitic, symbiotic or commensal relation with the host. The intestinal flora, i.e., the spectrum of microorganism indigenous to a particular mammal, usually include a variety of microorganism species living symbiotically with the host. This symbiotic relationship involves the digestion of food by the microorganism for the host, while the host affords protection and a source of nutrition for the microorganism. An infectious disease often times originates from the cultivation of pathogenic microorganisms in the gastrointestinal tract, but may also result from the abnormal reproduction of inherently non-pathogenic microorganisms therein. A disease of the latter type may be produced by the absorption of toxic metabolic products manufactured by the non-pathogenic microorganisms in abnormal concentrations through the intestinal wall into the blood stream. Thus, it is possible to treat an infectious disease by destroying or arresting the growth of microorganisms in the gastrointestinal tract. Also, it is sometimes desirable to control the overall growth of the intestinal flora or to selectively eliminate certain microorganisms species from such tract.

The control of intestinal flora in animals and human being has been obtained by the oral administration of sulfa drugs and antibiotics, e.g., Terramycin, Aureomycin, neomycin, streptomycin, etc. The sulfa drugs and antibiotics exert a wide spectrum of bactericidal and bacteriostatic effect upon the microorganisms of the intenstine, colon and stomach. However, the sulfa drugs and antibiotics are water-soluble in character, and as a result are rapidly absorbed through the intestinal wall and assimilated into the body processes. The metabolization of these anti-microorganism substances necessitates the administration of large dosages thereof to produce adequate control of the microorganisms in the gastrointestinal tract. The ingestion of large quantities of sulfa drugs and antibiotics, and the assimilation thereof into the body processes, may result in deleterious side effects to the mammal. Consequently, there is a constant need for improved agents for the control of microorganism growth in the gastrointestinal tract.

An object of this invention is to provide a means for controlling the growth of microorganisms in the gastrointestinal tract without producing deleterious side effects. Another object is to provide a treatment utilizing compounds which, although effectively controlling the growth of microorganisms in the gastrointestinal tract, are substantially non-absorbed through the intestinal wall into the blood stream. A further object is to provide a therapeutic agent for the treatment of infectious diseases which can be orally administered, but which is not absorbed from the gastrointestinal tract and assimilated into the body processes. Other objects and advantages will become apparent as the specification proceeds.

In one aspect of this invention there is provided a method of controlling the growth of microorganisms in the mammalian gastrointestinal tract which involves contacting the gastrointestinal tract with a compound characterized by being a water-insoluble salt of a cationic surfactant. This compound may be orally administered to animals and human beings to destroy or arrest the growth of microorganisms in the gastrointestinal tract. For the purposes of this invention, by "microorganisms" is meant microscopic plants or animals including bacteria, protozoa, virus and Rickettsia.

One class of compounds having utility for the purpose of this invention can be characterized structurally as being composed of the cationic fragment of a cationic surfactant and the anionic fragment of an anionic polyelectrolyte. The anionic fragment of these water-insoluble polyelectrolyte derivatives of a cationic surfactant may be derived from any anionic polyelectrolyte, such as polysulfonic acids, e.g. hexasulfonic acid (suramin) and polysulfonic acid resins (Amberlite IR–105); non-polymeric polysulfonic acids, e.g. acidic azo dyes such as Trypan Red and Direct Blue BB; polysulfuric esters, e.g. agar-agar and carrageen mucilage; polycarboxylic acids; e.g. polyacrylic acid, weak cation exchange resins, arabic acid, alginic acid, pectic acid; polysaccharinic acids such as carboxymethyl cellulose, oxidized starch, mucin, hyaluronic acid, polyglucuronic acid, and acids derived from naturally occurring gums such as tragacanth, locust bean, quince seed, linseed, karaya and acacia; mixed polycarboxylic acids and polysulfuric acid ester, e.g. heparin and chondroitin sulfuric acid; polyphosphonic acids, e.g. Duolite C–61; polyphosphoric esters, e.g. Duolite C–65 and phytic acid (hexaphosphoric acid ester); and polysilicates, e.g. bentonite.

Another class of compounds having especially desirable utility for the purpose of this invention can be characterized structurally as the reaction product of the cationic fragment of a cationic surfactant and the anionic fragment of an anionic surfactant. The anionic fragment of these water-soluble compounds can be derived from such compounds as fatty acids and soaps, i.e. sodium or potassium salts of a higher fatty acid, e.g. sodium strearate, potassium oleate, potassium octanoate, sodium decanoate, sodium laurate or other salts of fatty acids containing from 8 to 22 carbon atoms in which the hydrocarbon chains are either saturated or unsaturated. Also, this anionic fragment can be derived from such synthetic anionic surfactants as alkyl sulfates, alkyl sulfonates, alkyl aryl sulfonates and dialkyl sulfosuccinates. Further, such surface active compounds as cyclic acids, e.g., abietic and chloic, and acyl methyl taurides may be employed in producing this anionic fragment of the reaction product. By way of specific example of the type of synthetic anionic surfactants useful in forming the compounds of this invention, we mention dodecyl sulfate, octadecyl benzene sodium sulfonate, the ester of oleic acid, and hydroxy ethane sodium sulfonate.

The cationic fragment of this water-insoluble compound may be derived from surface active quaternary ammonium salts, such as the alkyltrimethylammonium halides, dialkyldimethylammonium halides, trialkylmethylammonium halides, wherein the alkyl group (or groups) can contain from 8 to 22 carbon atoms and can be saturated or unsaturated. Also, the surface active quaternary ammonium compound can contain an aromatic group, such as the benzyl group, and thus the cationic fragment of this reaction product can be obtained from such compounds as alkylbenzyldimethylammonium halides. We mention, for example, such specific cationic surfactants from which this cationic fragment can be derived as dimethyldidodecylammonium chloride, trimethyloctadecylammonium chloride, dodecyldimethylbenzylammonium chloride, octadecyldimethylbenzylammonium chloride, (p-diisobutylphenoxyethoxy)ethylbenzyldimethylammonium chloride, trimethyloctylammonium chloride, dimethyldodecylbenzylammonium chloride and methyltrioctadecylammonium chloride. Also, mixtures of different cationic surfactants can be employed, such as the naturally occurring mixtures where the quaternary ammonium compound is prepared from a natural fatty acid source. For example, trimethyl "coco" ammonium chloride, dimethyldi "tallow" ammonium chloride, trimethyl "soya" ammonium chloride, etc., are suitable sources for the cationic fragment of this reaction product. This cationic fragment may also be derived from surface active primary, secondary and tertiary amines, such as alkylamines, dialkylamines, dimethylalkylamines, bis(2-hydroxyethyl)alkylamines and N-alkyl-1,3-propanediamines, wherein the amines contain at least one alkyl chain having from 8 to 22 carbon atoms. By way of specific example, we mention such suitable amines as octadecylamine, dimethyloctadecylamine, bis(2-hydroxyethyl)octadecylamine, methyldioctadecylamine, dioctadecylamine, dimethyldodecylamine, and N-dodecyl-1,2-propanediamine. Further, polyamines, such as N-dodecyltrimethylenediamine and cyclic nitrogen compounds such as 1-alkylpyridinium halides, e.g. octadecylpyridinium chloride, can be employed to derive the cationic fragment of this reaction product.

The preparation of those compounds of this invention characterized by being composed of the cationic fragment of a cationic surfactant and the anionic fragment of an anionic surfactant is described in our co-pending patent application Serial No. 383,918, filed October 2, 1953. Also, that class of compounds characterized by being composed of the cationic fragment of a cationic surfactant and the anionic fragment of an anionic polyelectrolyte can be prepared by dissolving a cationic surfactant, e.g. trimethyloctadecylammonium chloride, in a solvent such as isopropyl alcohol, and adding the resulting solution to a solution of the anionic polyelectrolyte, e.g. sodium phytate. The resulting reaction mixture can then be heated to a temperature in the order of 40 to 80° C., and maintained at such temperature until the reaction has been completed. Thereafter, the reaction product, e.g. trimethyloctadecylammonium phytate, can be obtained as a dry product by dehydrating the reaction mixture in, for example, a vacuum oven.

In practicing this invention, the water-insoluble derivative of the cationic surfactant can be orally administered to an animal or a human being as a tablet, capsule, suspension, etc. Also, the water-insoluble compound may be included in a composition containing inert or other physiologically active ingredients such as a nutrient material, e.g. an animal feed or water.

These water-insoluble salts of a cationic surfactant are very useful in controlling bacteria and protozoa in the gastrointestinal tract, but some benefit may be obtained in treating the gastrointestinal tract to control any microorganism. This treatment may involve the therapeusis of microorganism infections originating in the gastrointestinal tract. Also, these water-insoluble compounds have been found to promote growth and enhance the efficiency of food utilization. Although such compounds may be employed in controlling the gastrointestinal flora of any mammal, especially significant treatment can be accorded to domestic animals such as hogs, cattle and sheep.

This invention can be further illustrated by the following specific examples:

*Example I*

Twenty-four (24) runt pigs of mixed breeding were selected from a herd which had previously undergone an outbreak of bacterial enteritis. These pigs were weighed, and after their temperatures had been determined they were randomly assigned to Control and Test groups.

A premix product, consisting of 20% of trimethyloctadecylammonium stearate and 80% of steamed bonemeal, was added to the pig ration of the Test group in the ratio of 5 pounds per ton of feed. After 14 days with this diet, the ratio of premix product in the feed was reduced to 2 pounds per ton for the remainder of the test period of 63 days.

The results were as follows:

| Number of pigs | Initial average weight of pigs | Mortality of pigs | Weight of pigs at end of first period | Weight of feed (lbs.) per 100 lbs. weight gained |
|---|---|---|---|---|
| Control, 12 | 20.9 | 6 | 47.0 | 346 |
| Test, 12 | 20.9 | 0 | 92.0 | 209 |

These results demonstrate the efficacy of trimethyloctadecylammonium stearate in reducing the mortality of pigs afflicted with bacterial enteritis in comparison with the mortality of untreated pigs.

*Example II*

Two groups of swine exposed to hemorrhagic dysentery were treated with Terramycin and trimethyloctadecylammonium stearate as follows:

One group of the swine were afflicted with a severe attack of the hemorrhagic dysentery and treated with Terramycin.

The second group of swine was observed closely and in the early stages of the disease treated with trimethyloctadecylammonium stearate. The trimethyloctadecylammonium stearate was included in the feed ration for the swine in a ration of 5 pounds per ton of feed.

The results were as follows:

| Group | Therapeutic agent | Number of Pigs | Mortality |
|---|---|---|---|
| A | Terramycin | 150 | 10 |
| B | Trimethyloctadecylammonium stearate | 180 | 0 |

The pigs treated with trimethyloctadecylammonium stearate were capable of being marketed 4 weeks in advance of those pigs treated with Terramycin.

*Example III*

A herd of pigs having a previous history of infection with salmonellosis for two consecutive years were treated with trimethyloctadecylammonium stearate. These pigs numbered 160, having an average age of 4.5 months and an average weight of 150 pounds. The trimethyloctadecyl stearate was included in the feed ratio for the pigs in a ratio of 2.5 pounds per ton of feed.

A sharp improvement in the behavior of the herd was noticed 24 hours after initiating the treatment. After an additional 48 hours all of the animals were normal. The animals were kept on the ration, including trimethyloctadecylammonium stearate for an additional 2 weeks and at the end of this time were performing very satisfactorily.

*Example IV*

Trimethyloctadecylammonium phytate was prepared by the following method:

Phytic acid in the amount of 10 grams (0.0154 mole) was dissolved in 50 ml. of water and charged into a 250 ml. Erlenmeyer flask. To this solution was added 7.4 gm. (0.185 mole) of sodium hydroxide dissolved in 35 ml. of water. Trimethyloctadecylammonium chloride (Arquad HT), in the amount of 63 grams (0.185 mole), was dissolved in 36 ml. of isopropyl alcohol and slowly added to the sodium phytate solution which was undergoing continuous agitation. The mixture was heated to a temperature of 60–70° C. and maintained at such temperature until all the Arquad HT had been added. The reaction mixture was poured into trays while hot, and then dried in a steam-heated vacuum oven. The dry product was obtained in a yield of 70 gm.

*Example V*

Trimethyloctadecylammonium pectate was prepared by the following method:

Pectic acid (technical) in the amount of 131 grams (0.5 mole), was dissolved in 200 ml. of water and charged into a 600 ml. beaker. To this solution was added 20 gms. (0.5 mole) of sodium hydroxide in 100 ml. of water. This thick solution was added to 339 grams of 52% trimethyloctadecylammonium chloride (0.5 mole) in isopropyl alcohol, with stirring. After the reaction had been completed the reaction mixture was poured onto trays while hot and dried on a steam bath. The yield of dry product was 385 gm.

*Example VI*

Trimethyloctadecylammonium carboxymethylcellulose was prepared by the following method:

Sodium carboxymethylcellulose, in the amount of 118 gms., and 339 gm. of 52% trimethyloctadecylammonium chloride in isopropyl alcohol were charged into a Waring Blendor. The reaction was effected while mixing. The gel-like product was partially dried in a tray on a steam bath. The semi-dried gel was then ground in a Waring Blendor using Dry Ice to keep the mass solid. Bonemeal, in an amount equivalent to 4 times the weight of the semi-dried gel, was slowly added to the Waring Blendor, while mixing, to yield a final product that contained 20% by weight of active trimethyloctadecylammonium carboxymethylcellulose.

*Example VII*

Bentonite, in the amount of 10 gms., and 20 grams of 52% active trimethyloctadecylammonium chloride were intimately mixed until a thick paste had formed. This paste material was added to 100 gms. of bonemeal in a Waring Blendor. Upon mixing a dry powder was obtained containing approximately 15% by weight of active trimethyloctadecylammonium bentonite.

*Example VIII*

Trimethyloctadecylammonium suramin (m-amino-benzoyl-m-amino-p-methylbenzoyl-1-naphthylamino-4,6,8-trisulfonate carbamide) was prepared by the following method:

A solution of 27.05 grams of 52% active trimethyloctadecylammonium chloride (Arquad HT) was intimately mixed with 9.52 grams of suramin to prepare Arquad HT-suramin salt. This mixture was added to 90.4 grams of bonemeal with stirring. The resulting mixture was dried, yielding an animal nutrient product containing approximately 20% by weight of active trimethyloctadecylammonium suramin.

*Example IX*

Trimethyloctadecylammonium phytate (hereinafter designated as A), trimethyloctadecylammonium carboxymethylcellulose (hereinafter designated as B) and trimethyloctadecylammonium pectate (hereinafter designated as C) were tested for feed efficiency in chickens in comparison with trimethylrosinammonium stearate (hereinafter designated as D) and trimethyloctadecylammonium stearate (hereinafter designated as E).

Three hundred (300) unsexed Arbor Acres White Rock chicks, obtained from the Rothway Hatchery, Chicago Heights, Illinois, were weighed and placed in electrically heated brooders. These chicks were fed for a period of 7 days on a basal ration having the following composition:

|  | Percent |
|---|---|
| Ground yellow corn | 64.0 |
| Soybean meal (44%) | 23.5 |
| Dried skim milk | 2.0 |
| Meat and bone scrap (50%) | 4.0 |
| Alfalfa meal (17%) | 2.5 |
| Steamed bonemeal | 1.5 |
| Ground limestone | 1.0 |
| Iodized salt | 0.45 |
| Manganese sulfate | 0.05 |
| Vitamin premix [1] | 1.00 |

[1] The vitamin premix employed herein contains the following:

|  | Concentration per lb. of premix | Concentration per lb. of basal ration |
|---|---|---|
| Riboflavin | 2 grams | 1 mg. |
| Niacin | 20 grams | 10 mg. |
| Ca pantothenate | 10 grams | 5 mg. |
| Vitamin $B_{12}$ [a] | 9 mg. | 45 mcg. |
| Choline | 454 grams | 227 mg. |
| Vitamin A [b] | 3,000,000 units | 1,500 units. |
| Vitamin D [b] | 600,000 units | 300 units. |
| Finely ground corn | 5,947 grams |  |

[a] Vitamin $B_{12}$ obtained from Pfizer Company and identified as Bicon 6 containing 6 mg. of Vitamin $B_{12}$ per pound.
[b] Nopco Dry Vitamin A and Vitamin $D_3$.

Of these 300 chicks, 224 were randomly assigned to 16 test lots. The growth-promotant substances, A, B, C, D and E, were mixed with steamed bonemeal on the basis of 20% by weight to obtain a "premix" product. These premixed products were incorporated into the basal ration at the rate of 37.5 mg. per pound, i.e. 75 gms. of growth-promotant substance per ton of feed. All basal rations were further supplemented with 1% of stabilized tallow.

The growth-promotant substances A, B, C and D were fed each to 3 of the 16 test lots of chicks, while growth promotant substance E was fed to a single lot of chicks. Also, 3 of such test lots were maintained on the basal ration without supplementation, except for one percent (1%) stabilized tallow, as a control.

The chicks were fed these rations for a period of 8 weeks, and consequently the final weights are based upon 9 weeks old chicks. The following table summarizes the growth and feed-efficiency data:

| Supplement to basal ration | Number of chicks | Mortality (8 weeks), percent | Average final weight of chicks (grams) | Difference in weight of chicks test vs. control (grams) | Feed efficiency [1] |
|---|---|---|---|---|---|
| None | 42 | 2.37 | 1,218 | | 2.53 |
| A | 42 | 2.37 | 1,282 | 5.2 | 2.49 |
| B | 42 | 0.00 | 1,292 | 6.0 | 2.40 |
| C | 42 | 0.00 | 1,249 | 2.5 | 2.42 |
| D | 42 | 4.76 | 1,246 | 2.2 | 2.38 |
| E | 14 | 0.00 | 1,255 | 3.0 | 2.43 |

[1] Feed efficiency is defined as grams of feed consumed to produce a weight gain of 1 gram.

These tabulated results indicate that increased growth rates and feed efficiencies were obtained when the basal ration was supplemented with penicillin and with the growth promotant substances of this invention.

*Example X*

Trimethyloctadecylammonium stearate was tested as a growth promotant for baby pigs fed on synthetic milk. The results of these tests are summarized below:

AVERAGE WEEKLY GAINS OVER PRECEDING WEEK (lbs.)

| Lot | Number of pigs | 1 week | 2 weeks | 3 weeks | 4 weeks | 5 weeks |
|---|---|---|---|---|---|---|
| 1 | 4 | 0.51 | 0.70 | 1.72 | 2.61 | 3.86 |
| 2 | 4 | 0.39 | 1.08 | 2.03 | 2.78 | 3.45 |
| 3 | 3 | 0.41 | 0.79 | 1.92 | 2.53 | 3.54 |

FEED EFFICIENCY (lbs. dry matter fed/lb. gain)

| Lot | Number of pigs | 1 week | 2 weeks | 3 weeks | 4 weeks | 5 weeks |
|---|---|---|---|---|---|---|
| 1 | 4 | 1.69 | 1.77 | 1.11 | 1.19 | 1.17 |
| 2 | 4 | 2.69 | 1.37 | 1.04 | 1.13 | 1.24 |
| 3 | 3 | 2.25 | 1.64 | 0.78 | 1.30 | 1.23 |

Lot 1—Fed synthetic milk plus trimethyloctadecylammonium stearate. Lot 2—Fed synthetic milk plus Aureomycin. Lot 3—Fed synthetic milk only.
Levels of promotant fed milk (dry matter): Trimethyloctadecylammonium stearate at 50 mg./kg. for first three weeks, at 500 mg./kg. after three weeks. Aureomycin at 50 mg./kg. throughout the five-week period.

AVERAGE GAIN AND FEED EFFICIENCY FOR 3-WEEK PERIOD (weeks 1, 2 and 3)

| Lot | Gain, lbs. | Efficiency |
|---|---|---|
| 1 | 2.93 | 1.37 |
| 2 | 3.50 | 1.33 |
| 3 | 3.13 | 1.19 |

AVERAGE GAINS AND FEED EFFICIENCY FOR 4th AND 5th WEEKS OF TEST

| Lot | Gain, lbs. | Efficiency |
|---|---|---|
| 1 | 6.47 | 1.18 |
| 2 | 6.23 | 1.19 |
| 3 | 6.07 | 1.26 |

The above data indicates that for the baby pig on a milk diet trimethyloctadecylammonium stearate is preferably used at concentrations above 50 mg. per kilogram of dry matter and is effective at concentrations up to at least 500 mg. per kg.

*Example XI*

Further tests were made with trimethyloctadecylammonium stearate on weanling pigs with the following results:

| Lot | Average initial weight, lbs. | Average daily gains over initial weight, lbs. | | | | |
|---|---|---|---|---|---|---|
| | | 2 weeks | 4 weeks | 6 weeks | 8 weeks | 10 weeks |
| 1 | 27.0 | 0.63 | 0.81 | 0.95 | 1.08 | 1.17 |
| 2 | 26.8 | 0.86 | 1.05 | 1.18 | 1.29 | 1.35 |
| 6 | 26.8 | 0.98 | 1.10 | 1.25 | 1.36 | 1.41 |
| 5 | 26.8 | 0.75 | 0.90 | 1.03 | 1.12 | 1.20 |

| Lot | Feed efficiency (lbs. feed/lbs. gain) | | | | |
|---|---|---|---|---|---|
| | 2 weeks | 4 weeks | 6 weeks | 8 weeks | 10 weeks |
| 1 | 2.37 | 2.56 | 2.64 | 2.76 | 2.94 |
| 2 | 2.26 | 2.46 | 2.63 | 2.84 | 3.03 |
| 6 | 2.18 | 2.44 | 2.55 | 2.72 | 2.90 |
| 5 | 2.28 | 2.52 | 2.61 | 2.81 | 3.02 |

Lot 1—Fed basal ration. Lot 2—Fed basal ration plus Aurofac at 5 lbs./ton. Lot 6—Fed basal ration plus trimethyloctadecylammonium stearate at 50 gm./ton. Lot 5—Fed Basal Ration plus trimethyloctadecylammonium stearate at 25 gm./ton.

Basal ration: Lbs.
Corn _____ 780
Soy bean oil meal _____ 140
Meat and bone scrap _____ 50
Fish solubles _____ 10
Limestone _____ 5
Dicalcium phosphate _____ 9
Iodized salt _____ 5
Trace minerals _____ 1
Vitamins A and D _____ 0.5
Fortafeed 2–49C _____ 9

*Example XII*

The effect of trimethyloctadecylammonium stearate on the growth of chicks was shown in the following test:

| Test No. | Lot | Average gains in weight, gm. | | Feed eff. to 8 wks. |
|---|---|---|---|---|
| | | 4 weeks | 8 weeks | |
| 1 | Basal | 462 | 1,154 | 2.72 |
| 1 | Basal plus trimethyloctadecylammonium stearate.[1] | 514 | 1,231 | 2.52 |
| 2 | Basal | 536 | 1,387 | 2.81 |
| 2 | Basal plus trimethyloctadecylammonium stearate.[1] | 512 | 1,416 | 2.64 |

[1] Trimethyloctadecylammonium stearate added to ration at 12½ mg./lb.

Composition of basal ration:
Gr. yellow corn _____ 64.0
Soy bean meal _____ 23.5
Dried skim milk _____ 2.0
Meat scraps _____ 4.0
Alfalfa meal _____ 2.5
St. bone meal _____ 1.5
Limestone _____ 1.0
Salt (Mn+I) _____ 0.5
Vitamin Premix[1] _____ 1.0

100.0

[1] Provides per pound of diet: Riboflavin 1 mg., Niacin 17 mg., Ca Pantothenate 2.5 mg., Vitamin B$_{12}$ 1.5 mcg., Choline Chloride 227 mg., A 1500 units, D 200 ICU.

*Example XIII*

Further tests were made as described in Example XII, except that the basal ration contained 62.0% yellow corn and 2.0% animal fat. The results were as follows:

AVERAGE GAINS IN WEIGHT

| Test | Lot | 4 weeks, gm. | 8 weeks, gm. |
|---|---|---|---|
| 3 | Basal | 514 | 1,164 |
| 3 | Basal plus trimethyloctadecylammonium stearate.[1] | | |

[1] Trimethyloctadecylammonium stearate added to ration at 12½ mg./lb.

FEED EFFICIENCY

| Test No. | Lot | 8 weeks |
|---|---|---|
| 3 | Basal | 2.67 |
| 3 | Basal plus trimethyloctadecylammonium stearate[1] | 2.55 |

[1] Trimethyloctadecylammonium stearate added to ration at 12½ mg./lb.

*Example XIV*

The following compounds were incorporated in the basal diet of weanling rats to determine their effect as growth stimulants:

(a) Trimethyloctadecylammonium stearate;
(b) Trimethyloctadecylammonium dodecyl sulphate;
(c) Trimethyloctadecylammonium alkyl benzene sulphonate; and (d) Trimethyloctadecylammonium oleylmenthyl tauride.

Eight rats per lot were tested, and the data given below reports the results on the second week of the tests. There is always a readjustment period when placing weanling rats on a diet and it is thus considered that the data on the first week may not be significant. The rats were taken off test after the 2-week period:

| Promotant | Level mg./kilo of feed | Gain in weight (7 to 14th day) grams |
|---|---|---|
| None | | 0.8 |
| (a) | 94.5 | 4.7 |
| (b) | 92.0 | 3.4 |
| (c) | 100.0 | 4.0 |
| (d) | 115.0 | 3.7 |

NOTE.—Basal diet: Casein to provide 9% protein, Cerelose 58%, lard 28.0%, salt mix U.S.P. No. 2, 4%, and adequate amounts of essential vitamins.

*Example XV*

A number of additional tests were run employing compounds falling within the scope of this invention as additives to chicken feed composed of a basal ration similar to that described in Example XII. A summary of these tests is set out below; the weights at 4, 6 and 8 weeks being given in grams:

| Age (weeks) | 4 | 6 | 8 |
|---|---|---|---|
| Basal | 415 | 754 | 1,215 |
| Basal+A-1 50 mg./lb | 431 | 768 | 1,240 |
| Basal+A-1 75 mg./lb | 439 | 781 | 1,253 |
| Basal+A-2 50 mg./lb | 426 | 755 | 1,220 |
| Basal+A-2 75 mg./lb | 424 | 780 | 1,257 |
| Basal+A-3 50 mg./lb | 454 | 789 | 1,241 |
| Basal+A-3 75 mg./lb | 452 | 811 | 1,298 |
| Basal+A-4 50 mg./lb | 459 | 784 | 1,257 |
| Basal+A-4 75 mg./lb | 442 | 804 | 1,256 |

Summary of feed efficiency in above experiment:

|  | Feed/pound gain to 8 weeks |
|---|---|
| Basal | 2.86 |
| Basal+A-1 | 2.71 |
| Basal+A-2 | 2.72 |
| Basal+A-3 | 2.79 |
| Basal+A-4 | 2.64 |

Summary of growth response in grams of chicks to additions of A-2 to the diet:

| Age (weeks) | 4 | 6 | 8 |
|---|---|---|---|
| Basal | 377 | 666 | 1,115 |
| Basal+A-2 40 mg./lb | 396 | 688 | 1,134 |
| Basal+A-2 80 mg./lb | 426 | 740 | 1,222 |
| Basal+A-2 160 mg./lb | 408 | 715 | 1,138 |
| Basal+A-2 40 mg./lb. to 4 wks., 160 mg./lb. 4-8 wks | 403 | 728 | 1,197 |

The compound identification symbols used in this example have the following meaning:

A-1—trimethyloctadecylammonium stearate
A-2—trimethyloctadecylammonium dodecyl sulphate
A-3—trimethyloctadecylammonium dodecyl benzene sulphonate
A-4—trimethyloctadecylammonium oleylmethyl tauride In preparing the hog and chicken feed materials described in the above examples, the growth-promotant substance, such as trimethyloctadecylammonium stearate, were intimately mixed with another feed ingredient, such as one of the commonly used feed ingredients like bone meal or limestone, to produce 5% to 10% premix. An appropriate amount of this premix was then distributed throughout the entire feed in a feed mixer. The premix can be made conveniently in any mixer. The premix can be made conveniently in any mixer which provides a grinding action in addition to stirring. Alternatively the growth-promotant substance can be dissolved in a solvent, such as ethanol, propanol-2, etc., and the solubilized material mixed with the bone meal or other commonly used feed ingredient as described above.

The range of effectiveness of the growth-promotant substances of this invention depends on the age and species of the animal being fed. Experiments have shown response from 12 grams up to 500 grams per ton of feed. A favorable range for growing poultry and swine appears to be about 25 to 200 grams per ton of feed. However, greater or lesser amounts can be employed with considerable success.

The growth-promotant substances described herein not only speed up growth of the animal, but also improve the efficiency of feed conversion. This is an important advantage, since it makes the growing process more economical for animal raisers by requiring less feed per pound of weight gain.

*Example XVI*

The following tables depict the feed efficiency and growth promotion obtained by the administration to chicks of compounds of the class characterized by being composed of the cationic fragment of a cationic surfactant and the anionic fragment of an anionic surfactant:

| Compound | Ratio of compound to basal ration [2] (mg./lb.) | Average gain (grams) | | Length of test (days) | Feed efficiency | |
|---|---|---|---|---|---|---|
| | | Test | Control | | Test | Control |
| Dioctadecylammonium oleate | 75 | 1,380 | 1,360 | 56 | 2.30 | 2.41 |
| Dimethyldodecylammonium oleate | 75 | 1,476 | 1,360 | 56 | 2.38 | 2.41 |
| Bis(2-hydroxyethyl)cocoammonium oleate | 75 | 1,464 | 1,360 | 56 | 2.36 | 2.41 |
| Trimethyloctadecylammonium stearate | 27.5 | 1,284 | 1,163 | 56 | 2.39 | 2.53 |
| Trimethylalkyl [1] ammonium stearate | [3] 22.7 | 1,285 | 1,144 | 56 | 2.48 | 2.57 |
| p-diisobutylphenoxyethoxyethyldimethylbenzylammonium stearate | 75 | 1,418 | 1,356 | 56 | 2.38 | 2.41 |

[1] Alkyl groups derived from hydrogenated tallow.
[2] This basal ration had the following composition:

| | Percent |
|---|---|
| Ground yellow corn | 57 |
| Pulverized heavy oats | 5 |
| Wheat standard middlings | 5 |
| Dehydrated alfalfa meal | 2.5 |
| Soya bean meal | 19.9 |
| Meat and bone scraps | 2.5 |
| Fish meal | 2.5 |
| Dried whey | 2.5 |
| Pulverized limestone | 1.0 |
| Dicalcium phosphate | 1.0 |
| Iodized salt | 0.5 |
| Manganous sulfate | 0.025 |
| 400 I.C.U. Vitamin D₃ | } 0.13 |
| 3,000 I.U. Vitamin A | |
| CAMO Starter Vitamin Mix | 0.5 |
| Vitamin B₁₂—5 mcg. per kg. | |

The tested compound was substituted for the corn in the basal ration and the total concentration of corn and the tested compound was 57%.
[3] The basal ration had added thereto 2% by weight of lard.

| Compound | Ratio of compound to basal ration [2] (mg./lb.) | Average gain (grams) | | Length of test (days) | Feed efficiency | |
|---|---|---|---|---|---|---|
| | | Test | Control | | Test | Control |
| Trimethyloctadecylammonium octanoate | 50 | 960 | 943 | 49 | 2.28 | 2.45 |
| Trimethyloctylammonium stearate | 50 | 966 | 943 | 49 | 2.26 | 2.45 |
| Dimethyldodecylbenzylammonium lauryl sulfate | 100 | 1,049 | 943 | 49 | 2.24 | 2.45 |
| Trimethylalkyl [1] ammonium alkylaryl sulfate | 69 | 1,205 | 1,129 | 49 | 2.76 | 2.86 |
| Trimethylalkyl [1] ammonium oleoylmethyltauride | 52 | 1,165 | 1,129 | 9 | 2.67 | 2.86 |
| Cetylpyridinium oleoylmethyltauride | 50 | 1,036 | 943 | 49 | 2.25 | 2.45 |

[1] Alkyl groups derived from hydrogenated tallow.
[2] The basal ration had the following composition:

| | Percent |
|---|---|
| Ground yellow corn | 64 |
| Soya bean meal | 23.5 |
| Dried skim milk | 2.0 |
| Meat and bone scraps | 4.0 |
| Dehydrated alfalfa meal | 2.5 |
| Steamed bone meal | 1.5 |
| Pulverized limestone | 1.0 |
| Iodized salt | 0.45 |
| Manganous sulfate | 0.05 |
| Vitamin premix | 1.0 |

The tested compound was substituted for ground yellow corn in this basal ration, and the total concentration therein of ground yellow corn nd the tested compound was 64%.

The vitamin premix was composed of the following substances in such mount as to provide in the basal ration the designated concentration ereof:

| | | |
|---|---|---|
| Riboflavin | mg | 1 |
| Niacin | mg | 17 |
| Pantothenic acid | mg | 2.5 |
| Vitamin B$_{12}$ | mcg | 1.5 |
| Choline | mg | 227 |
| Vitamin A | I.U. | 1,500 |
| Vitamin D | I.C.U. | 200 |

While in the foregoing specification various embodiments of this invention have been set forth and specific details thereof elaborated for the purpose of illustration, it will be apparent to those skilled in the art that the invention is susceptible to other embodiments and that many of these details may be varied widely without departing from the basic concept and spirit of the invention.

We claim:

1. The method of controlling excessive growth of microorganisms in the mammalian gastrointestinal tract, which comprises introducing into said gastrointestinal tract a compound formed by the interaction of the cationic fragment of a cationic surfactant and the anionic fragment of an anionic polyelectrolyte.

2. The method of controlling excessive growth of microorganisms in the mammalian gastrointestinal tract, which comprises introducing into said gastrointestinal tract a compound formed by the interaction of the cationic fragment of a cationic surfactant and the anionic fragment of an anionic surfactant.

3. The method of claim 2 in which said cationic surfactant is a quaternary ammonium surfactant.

4. The method of claim 2 in which said cationic surfactant is a trimethyloctadecylammonium surfactant.

5. The method of controlling excessive growth of microorganisms in the mammalian gastrointestinal tract, which comprises introducing into said gastrointestinal tract a compound characterized by being a water-insoluble salt of a trimethyloctadecylammonium surfactant.

6. The method of controlling excessive growth of microorganisms in the mammalian gastrointestinal tract, which comprises introducing into said gastrointestinal tract trimethyloctadecylammonium stearate.

7. The method of controlling excessive growth of microorganisms in the mammalian gastrointestinal tract, which comprises introducing into said gastrointestinal tract a compound formed by the interaction of the cationic fragment of a trimethyloctadecylammonium surfactant and the anionic fragment of an anionic polyelectrolyte.

8. The process of claim 7 in which said anionic polyelectrolyte is a polysulfo acid.

9. The method of claim 7 in which said anionic polyelectrolyte is a polyphospho acid.

10. The method of claim 7 in which said anionic polyelectrolyte is a polycarboxy acid.

11. The method of claim 7 in which said anionic polyelectrolyte is a polysilicate.

12. The method of controlling excessive growth of microorganisms in the mammalian gastrointestinal tract which comprises introducing into said gastrointestinal tract trimethylalkylammonium stearate where the alkyl group is derived from hydrogenated tallow.

13. The method of treating ruminants afflicted with bacteria causing intestinal disorders which comprises administering to the ruminant animal a compound formed by the interaction of the cationic fragment of a quaternary ammonium surfactant and the anionic fragment of an anionic surfactant, said compound being substantially insoluble and non-surface active in water.

References Cited in the file of this patent

UNITED STATES PATENTS 2,295,505    Shelton    Sept. 8, 1942

OTHER REFERENCES

Jordan: J. of Animal Science, vol. 17, No. 1, February 1955, pp. 152, 153, 155.

Branion: Poultry Science, vol. 33, No. 1, January 1954, pp. 62–66, part. p. 64.

Soap and Sanitary Chemicals, May 1948, p. 145.

Drug and Cos. Ind., vol. 75, No. 3, September 1954, pp. 384 and 385.